United States Patent
Burchert et al.

(10) Patent No.: US 6,826,899 B2
(45) Date of Patent: Dec. 7, 2004

(54) ROTOR SHAFT FOR AN OPEN-END SPINING ROTOR

(75) Inventors: Mathias Burchert, Deggingen (DE); Friedbert Schmid, Bad Ueberkingen (DE)

(73) Assignee: Rieter Ingolstadt Spinnereimaschinenbau AG, Ingolstadt (DE)

( * ) Notice: Subject to any disclaimer, the term of this patent is extended or adjusted under 35 U.S.C. 154(b) by 0 days.

(21) Appl. No.: 10/344,986

(22) PCT Filed: Apr. 25, 2002

(86) PCT No.: PCT/EP02/04556

§ 371 (c)(1),
(2), (4) Date: Jul. 8, 2003

(87) PCT Pub. No.: WO03/000972

PCT Pub. Date: Jan. 3, 2003

(65) Prior Publication Data

US 2004/0093847 A1 May 20, 2004

(30) Foreign Application Priority Data

Jun. 20, 2001 (DE) .......................................... 101 30 736

(51) Int. Cl.[7] .................................................. D01H 4/12
(52) U.S. Cl. ........................................... 57/404; 57/406
(58) Field of Search .................... 57/404–417; 384/130, 384/138, 146, 147

(56) References Cited

U.S. PATENT DOCUMENTS

| 4,618,273 A | * | 10/1986 | Gotz et al. ................... 384/606 |
| 4,763,469 A | * | 8/1988 | Stahlecker et al. ........... 57/407 |
| 4,773,210 A | * | 9/1988 | Landwehrkamp et al. ..... 57/406 |
| 5,175,992 A | * | 1/1993 | Stahlecker .................... 57/406 |
| 5,222,353 A | * | 6/1993 | Stahlecker .................... 57/406 |
| 5,261,221 A | * | 11/1993 | Stahlecker et al. ........... 57/406 |
| 5,349,809 A | | 9/1994 | Stahlecker .................... 57/406 |
| 5,927,869 A | | 7/1999 | Zott ............................ 384/510 |
| 5,966,920 A | * | 10/1999 | Wassenhoven et al. ....... 57/406 |

FOREIGN PATENT DOCUMENTS

| DE | 195 42 908 | 5/1997 |
| DE | 196 52 507 | 6/1998 |
| WO | 03/000972 | 1/2003 |

* cited by examiner

Primary Examiner—John J. Calvert
Assistant Examiner—Shaun R Hurley

(57) ABSTRACT

A rotor shaft of an open-end spinning rotor is provided with a peg-like shaft end having a reduced diameter. The shaft end has a front-end supporting surface which can be arranged to a step bearing, said supporting surface being provided with a wear-resistant insert. The reduced diameter of the peg-like shaft end is at least 0.68 times the diameter of the rotor shaft. In addition, the reduced diameter of the shaft end measures at least 0.82 times the length of the peg-like shaft end.

13 Claims, 1 Drawing Sheet

ROTOR SHAFT FOR AN OPEN-END SPINNING ROTOR

BACKGROUND AND SUMMARY OF THE INVENTION

The present invention relates to a rotor shaft of an open-end spinning rotor having a peg-like shaft end with a reduced diameter and a front-end supporting surface which can be arranged at a step bearing, said supporting surface being provided with a wear-resistant insert.

A rotor shaft of this type is prior art in German published patent application 196 52 507. A step bearing housing filled with a lubricant is arranged at the end area of the rotor shaft, which step bearing housing is provided for the purpose of inserting the rotor shaft with a larger and a following smaller opening, whereby these openings form sealing gaps in relation to the rotor shaft during operation. The larger opening is arranged at the normal diameter of the rotor shaft, the smaller opening at the peg-like shaft end.

In the case of the high speeds for open-end spinning rotors strived for today, the dimensions of the rotor shaft play a not unimportant role, as even the smallest increase in the critical speeds of the rotor shaft can lead to higher operational speeds of the open-end spinning rotor and thus in the open-end spinning machine overall. For this reason it is no longer sufficient to give the peg-like shaft length such dimensions that only the best possible sealing of the end area of the rotor shaft is achieved in relation to the step bearing housing filled with lubricant; rathermore, the peg-like shaft end must be given dimensions to also provide an increase of the critical speed of the rotor shaft overall.

It is an object of the present invention to optimize a rotor shaft of the above mentioned type not only in regard to its sealing properties at the step bearing but also in regard to high critical speeds.

This object has been achieved in accordance with the present invention in that the reduced diameter of the peg-like shaft end measures at least 0.68 times the diameter of the rotor shaft and at least 0.82 times the length of the peg-like shaft end.

The above mentioned dimensions of the peg-like shaft end were empirically optimized according to the object of the invention and are in particular suited to a diameter of the rotor shaft which lies in the range of between 8.0 and 8.3 mm. If a diameter of the rotor shaft goes below 8.0 mm, the critical speed of the open-end spinning rotor overall would be lowered, whereas if a diameter of 8.3 mm is exceeded, the speed of the tangential belt driving the open-end spinning rotor would be so high that the lifetime of the tangential belt would be impaired. The peg-like shaft end adapted to the above diameter range is more compact than the standard shaft end used up to now, that is, even in the area of the reduced diameter, it is somewhat larger and overall shorter. Optimal dimensions were reached when the reduced diameter of the peg-like shaft end measured approximately 0.7 times the diameter of the rotor shaft and approximately 0.9 times the length of the peg-like shaft end.

The wear resistant insert, which can, for example, be designed as the support surface comprising the ceramic pin, should not be neglected in the above considerations. It has been shown that the peg-like shaft end is extended by between 0.1 and 0.5 mm by the wear resistant insert. Longer extensions have, however, a negative effect on the level of possible operational speeds of the open-end spinning rotor.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
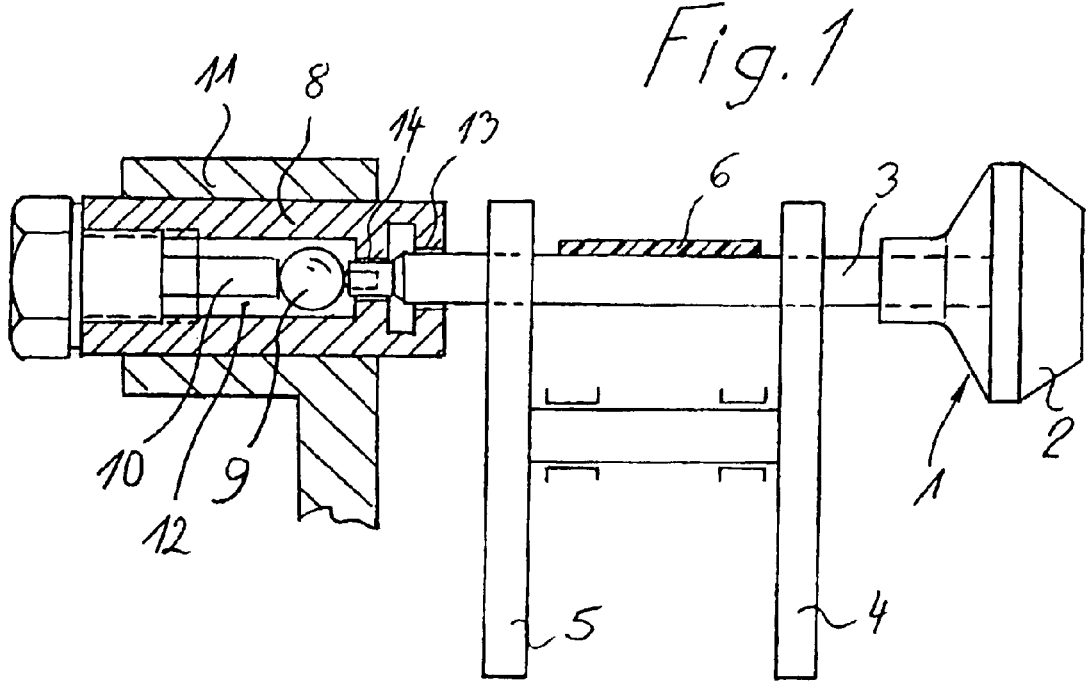
FIG. 1 is a partly intersectional side view of an open-end spinning rotor comprising a rotor shaft according to the present invention.
Figure 2:
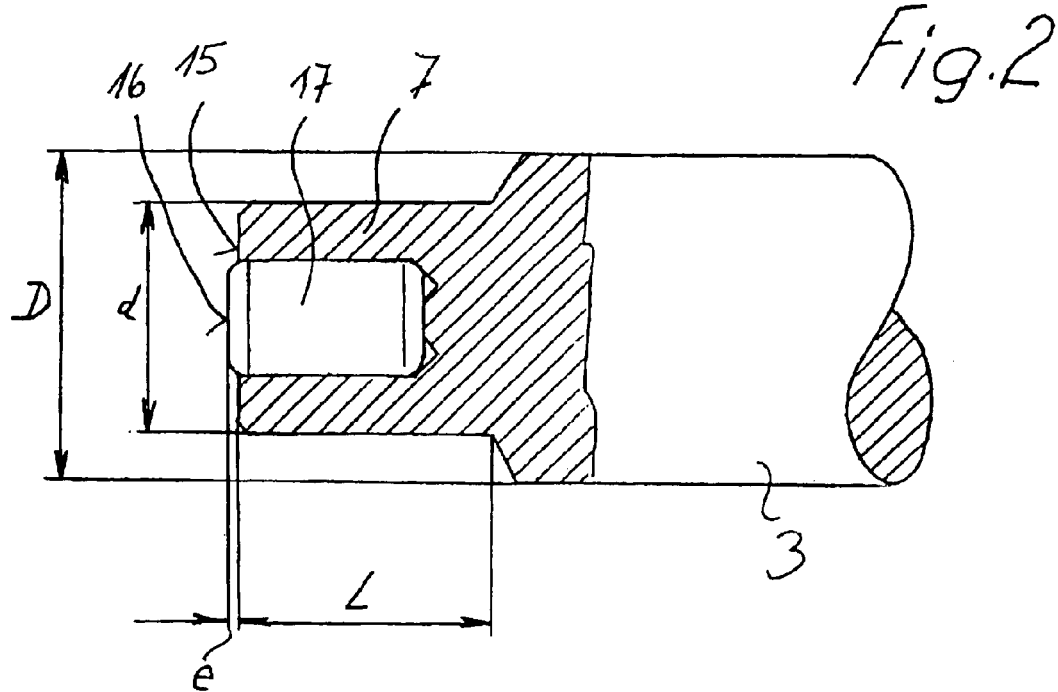
FIG. 2 is in enlarged dimensions the peg-like shaft end of the rotor shaft.

An open-end spinning rotor 1 comprises in the known way a rotor cup 2 and a rotor shaft 3 affixed thereto, which rotor shaft 3 is supported in radial direction in the known way on supporting disc pairs 4 and 5 and driven by means of a tangential belt 6. The rotor shaft 3 comprises a peg-like shaft end 7, whose diameter d is smaller than the preceeding diameter D of the rotor shaft 3.

The end area of the rotor shaft 3 comprising the peg-like shaft end 7 is arranged at step bearing 8, against which the rotor shaft 3 is pressed by means of an axial thrust generated during operation of the open-end spinning rotor 1. The step bearing 8 comprises a supporting ball 9, on which the rotor shaft 3 is supported and which in turn is disposed on a pin-like thrust bearing 10. The step bearing 8 itself is held in a machine housing 11 which is indicated only.

The inside of the step bearing 8 comprises a chamber 12 filled with a lubricant, in which the end area of the rotor shaft 3 can be inserted through two bore holes 13 and 14 of different sizes. The bore holes 13 and 14 form non-contact sealing gaps in relation to the diameters D and d of the rotor shaft 3.

The frontal end 15 of the rotor shaft 3 is provided with an axial supporting surface 16, which is applied to a ceramic pin 17, which is inserted into a corresponding bore hole of the peg-like shaft end 7.

The rotor shaft 3 must have a critical speed in the case of the chosen axial and radial bearing which enables operational speeds in the range of up to 150,000 rpm. This is then the case when the rotor shaft 3 has a diameter D in the range of 8.0 to 8.3 mm. The upper limit is determined by the fact that the running speed of the tangential belt 6 is not permitted to exceed a certain level.

The peg-like shaft end 7, which in the case of prior art rotor shafts 3 was designed with first and foremost a good sealing effect in relation to the step bearing 8 in mind, is now designed in such a way that it also contributes to the increase in the overall critical speed of the rotor shaft 3. For this reason it is provided that the reduced diameter d of the peg-like shaft end 7 measures at least 0.68 times the diameter D of the rotor shaft 3 and it also measures at least 0.82 times the length L of the peg-like shaft end 7. The amount e, by which the wear resistant insert 17 projects beyond the peg-like shaft end 7, should lie in the range of between 0.1 mm and 0.5 mm.

What is claimed is:

1. A rotor shaft of an open-end spinning rotor having a peg-like shaft end with a reduced diameter and a front-end supporting surface which can be arranged at a step bearing, said supporting surface being provided with a wear-resistant insert, wherein the reduced diameter of the peg-like shaft end measures at least 0.68 times the diameter of the rotor shaft and at least 0.82 times the length of the peg-like shaft end, and wherein the diameter of the rotor shaft is between 8.0 mm and 8.3 mm.

2. Rotor shaft according to claim 1, wherein the reduced diameter of the peg-like shaft end measures approximately 0.7 times the diameter of the rotor shaft and approximately 0.9 times the length of the peg-like shaft end.

3. Rotor shaft according to claim 2, wherein the wear-resistant insert extends the peg-like shaft end by an amount of approximately 0.1 to 0.5 mm.

4. Rotor shaft according to claim 1, wherein the wear-resistant insert extends the peg-like shaft end by an amount of approximately 0.1 to 0.5 mm.

5. An open-end spinning assembly comprising:

a rotor shaft supporting a spinning rotor at a first axial end thereof, and a step bearing axially supporting the rotor shaft at a second axial end opposite the first axial end, wherein said rotor shaft has a peg-like shaft portion of a peg length leading to the second axial end and joining with a basic diameter over a substantial part of its length terminating at the first axial end, said peg-like shaft end having a reduced diameter as compared to the basic diameter, said reduced diameter measuring at least 0.68 times the basic diameter and at least 0.82 times the length of the peg-like shaft end, and wherein the diameter of the rotor shaft is between 8.0 mm and 8.3 mm.

6. An open-end spinning assembly according to claim 5, wherein said step bearing includes a support ball disposed at said second end of the rotor shaft.

7. An open-end spinning assembly according to claim 6, wherein said rotor shaft extends through a pair of axially spaced openings in a housing of the step bearing, one of said openings conforming to the main diameter of the rotor shaft and the second opening conforming to the reduced diameter of the peg-like shaft portion.

8. An open-end spinning assembly according to claim 7, comprising a wear-resistant insert inserted in an opening of the rotor shaft at said second end, said ball engaging said insert during use of the spinning assembly.

9. An open-end spinning assembly according to claim 8, wherein the reduced diameter measures approximately 0.7 times the main diameter.

10. An open-end spinning assembly according to claim 9, wherein the reduced diameter measures approximately 0.9 times the peg length.

11. An open-end spinning assembly according to claim 10, wherein the wear-resistant insert extends the peg-like shaft end by between 0.1 mm and 0.5 mm.

12. An open-end spinning assembly according to claim 8, wherein the reduced diameter measures approximately 0.9 times the peg length.

13. An open-end spinning assembly according to claim 8, wherein the wear-resistant insert extends the peg-like shaft end by between 0.1 mm and 0.5 mm.

* * * * *